Jan. 5, 1932. A. E. PEW, JR 1,839,892
OIL FILTER
Filed April 29, 1930
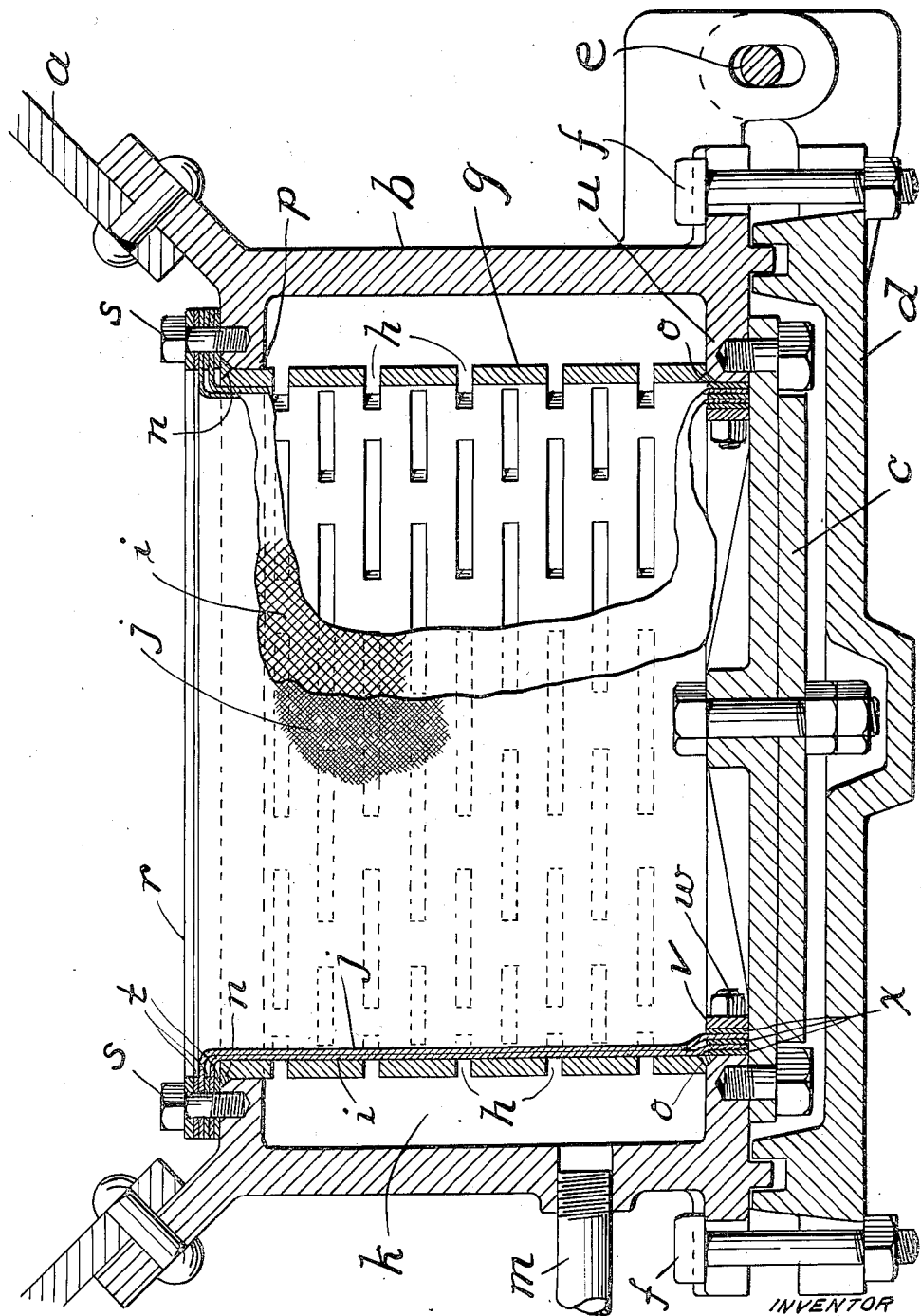
WITNESS:
Robt R Mitchel.
INVENTOR
Arthur E. Pew, Jr.
BY
ATTORNEYS.

Patented Jan. 5, 1932

1,839,892

UNITED STATES PATENT OFFICE

ARTHUR E. PEW, JR., OF BRYN MAWR, PENNSYLVANIA, ASSIGNOR TO SUN OIL COMPANY, OF PHILADELPHIA, PENNSYLVANIA, A CORPORATION OF NEW JERSEY

OIL FILTER

Application filed April 29, 1930. Serial No. 448,197.

My invention relates to filter heads and particularly to that construction which comprises a cylindrical head secured to the bottom of a filter, a perforated ring within and concentric with the body of the head and spaced therefrom to provide an outflow space for the filtered liquid, and a screen, usually composed of two layers, applied to the inner face of the ring. The filtering material entirely fills the ring.

Such filter heads are particularly efficient in the filtration of oil, but leakage of the clay into the oil outflow space has not been heretofore effectually prevented. When such leakage occurs the piping soon becomes plugged and the filter must be shut down and cleaned out. Such leakage also results in serious loss of oil and filtration material.

The object of my invention is to prevent such leakage.

I have discovered that such leakage arises from defective means, usually retaining rings, for securing the screen within the ring and from lack of tightness between the ring and the body of the head.

My invention comprises novel means for securing the perforated ring to the body of the head and novel means for securing the screen in position, whereby leakage of filtration material is effectually prevented.

A preferred embodiment of the invention is shown in the accompanying drawing, which shows an embodiment of my invention is section.

To the filter bottom $a$ is secured a cylindrical head $b$, which is closed by the bottom plate $c$ bolted thereto. The filter head is hinged at $e$ to a cover $d$, the head and cover being secured in fixed relation by means of bolts and nuts $f$.

Positioned within the head $b$ in concentric relation thereto, and spaced therefrom, is a ring $g$ having perforations $h$. A screen, composed preferably of two layers $i$ and $j$, is applied to the inside face of the ring.

Any suitable filtering material, which I shall designate by the term "clay", is deposited in the filter and entirely fills the head $b$. Oil, or other fluid intended to be filtered, flows down through the clay filter bed and through the screen and the perforations in the ring $g$ into the annular space $k$ between the head $b$ and ring $g$ and thence out through an outlet $m$.

The construction, so far as above described, is known.

If any clay leaks out into the oil space $k$, the piping soon becomes plugged up and it becomes necessary to shut down the filter, which involves great loss of time and, in many cases, results in the loss of a large amount of clay and oil. Such leakage ordinarily occurs in the commercial operation of the filter.

The ring $g$ is usually seated in the head at top and bottom and the screen is held in position, at top and bottom, by retaining rings. The leakage described is found to occur at the screen retaining rings and around through the top and bottom seats. The usual construction whereby the ring $g$ is secured to the head $b$ and the screen to the ring $g$, and which permits leakage, is not herein shown, since my invention comprises the abandonment of this construction and the provision of novel means for securing these parts intended and adapted to effectually prevent the described leakage.

In my invention the ring $g$ is welded to the head $b$ at top and bottom, as indicated at $n$ and $o$, as hereinafter more particularly described.

The screen layers $i$ and $j$ extend substantially above the top of ring $g$ and are bent down over the top of the ring and over the upper side of an annular flange $p$ extending inward from the cylindrical body of the head $b$ and abutting against the ring and constituting the top of the outflowing oil space $k$. A retaining ring $r$ overlies the bent-out upper ends of the screen layers, which are confined between the flange $p$ and the ring $r$ by means of bolts $s$. The upper ends of the screen layers are separated from each other and from the ring $r$ and flange $p$ by means of gaskets $t$.

The screen layers $i$ and $j$ extend substantially below the bottom of ring $g$ and lie against the inner edge of an annular flange $u$ extending inward from the cylindrical body of the head $b$ and constituting the bottom of the oil outflow space $k$. The ring $g$ rests on the inner edge of flange $u$, the inside faces of the ring and flange being preferably flush. The lower ends of the screen layers are secured tightly against the inner edge of the flange $u$ by means of an inside retaining ring $v$ and bolts $w$. The lower ends of the screen layers are separated from each other and from the flange $u$ and ring $v$ by means of gaskets $x$.

The described construction of head and ring permits of securing these parts together by welding. The upper weld is applied to the junction of the outer corner of the flange $p$ and the upper end of the ring $g$. The lower weld is applied to the junction between the inner corner of the flange $u$ and the lower end of the ring $g$.

The described construction has been found to effectually prevent any leakage of clay out of the head. The only possible leakage that could occur would be in case of actual puncturing of the wire screen.

Having now fully described my invention, what I claim and desire to protect by Letters Patent is:

1. The combination with a filter bed, an orificed ring within the head and spaced therefrom and providing between them an annular fluid outflow space, and a screen applied to the inner face of the ring, of a flange extending inward from the body of the head and engaging the outer face of the ring at one end thereof and constituting an end wall of said fluid outflow space, said flange being welded to the ring at the junction of the outer corner of the flange and the end of the ring.

2. The combination with a filter bed, an orificed ring within the head and spaced therefrom and providing between them annular fluid outflow space, and a screen applied to the inner face of the ring, of a flange extending inward from the body of the head beyond and in contact with and substantially flush with one end of the ring and constituting an end wall of said fluid outflow space, said flange being welded to the ring at the junction of the inner corner of the flange and the contiguous end of the ring.

3. The combination with an annular filter head, of an inwardly extending flange at one end thereof, an orificed ring spaced from the head and abutting against said flange, whose inner face is substantially flush with the inner face of the orificed ring, a screen applied to the inner face of the orificed ring and extending at one end beyond the orificed ring and against the inner face of said flange, a holding ring inside the extended end of the screen, and means confining the extended end of the screen between the holding ring and the inner face of the flange.

4. The combination, with an annular filter head, of an orificed ring, inwardly extending flanges extending from opposite ends of the head, one flange being wider than the other flange, the difference in their widths substantially corresponding to the thickness of the orificed ring, said orificed ring abutting against the wider flange and extending within the narrower flange, a screen applied to the inner face of the orificed ring and extending at one end outward over the orificed ring and the narrower flange and extending at the other end within the inner face of the wider flange, and means securing the ends of the screen against the respective flanges.

5. The combination, with an annular filter head, of inwardly extending flanges at the upper and lower ends thereof, an orificed ring spaced from the head and resting on, and substantially flush with the inner face of, the lower flange and extending within, and contacting with, the inner face of the upper flange, a screen applied to the inner face of the orificed ring, said screen extending above the orificed ring and bent out and down over the upper edge of the orificed ring and the upper face of the upper flange, said screen extending below the orificed ring and against the inner face of the lower flange, an upper holding ring extending over the bent out upper end of the screen, a lower holding ring extending within the lower end of the screen, means confining the bent out upper end of the screen between the upper holding ring and the upper face of the upper flange, and means confining the lower end of the screen between the lower holding ring and the inner face of the lower flange.

6. The combination, with an annular filter head, of inwardly extending flanges at the upper and lower ends thereof, an orificed ring spaced from said head and at its opposite ends extending against said flanges, an annular screen applied to the inner face of the orificed ring and at opposite ends extending beyond the orificed ring, and rings between which and the respective flanges the extended ends of the screen are respectively secured, each flange being welded to the ring at the junction of one corner of the flange and the corresponding end of the ring.

In testimony of which invention, I have hereunto set my hand, at Philadelphia, Pennsylvania, on this 28th day of April, 1930.

ARTHUR E. PEW, Jr.